US012693863B2

(12) United States Patent
Srivatsan et al.

(10) Patent No.: US 12,693,863 B2
(45) Date of Patent: Jul. 28, 2026

(54) UN-MARK INSTRUCTIONS ON AN INSTRUCTION MATCH TO REDUCE RESOURCES REQUIRED TO MATCH A GROUP OF INSTRUCTIONS

(71) Applicant: INTERNATIONAL BUSINESS MACHINES CORPORATION, Armonk, NY (US)

(72) Inventors: Shricharan Srivatsan, Austin, TX (US); John A. Schumann, Austin, TX (US); Wallace Keith Sharp, Round Rock, TX (US); Gregory A. Kemp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 17/394,367

(22) Filed: Aug. 4, 2021

(65) Prior Publication Data

US 2023/0048717 A1     Feb. 16, 2023

(51) Int. Cl.
G06F 9/38     (2018.01)
G06F 9/32     (2018.01)

(52) U.S. Cl.
CPC ............. G06F 9/3802 (2013.01); G06F 9/32 (2013.01); G06F 9/3836 (2013.01)

(58) Field of Classification Search
None
See application file for complete search history.

(56) References Cited

U.S. PATENT DOCUMENTS

| | | | |
|---|---|---|---|
| 6,631,463 B1 * | 10/2003 | Floyd | G06F 9/3802 |
| | | | 712/E9.055 |
| 7,389,383 B2 | 6/2008 | Tremblay et al. | |
| 7,814,466 B2 | 10/2010 | Chen et al. | |
| 9,170,811 B2 | 10/2015 | Mudawar | |
| 10,346,168 B2 | 7/2019 | Burger et al. | |
| 10,430,186 B2 | 10/2019 | Calciu et al. | |
| 10,776,123 B2 | 9/2020 | Swanson et al. | |
| 10,853,075 B2 | 12/2020 | Agrawal et al. | |
| 2007/0260860 A1 | 11/2007 | Chen et al. | |
| 2007/0261034 A1 | 11/2007 | Chen et al. | |
| 2014/0195781 A1 | 7/2014 | Mudawar | |
| 2017/0132009 A1 | 5/2017 | Pota et al. | |

(Continued)

OTHER PUBLICATIONS

Narayanasamy, S. et al., "Creating Converged Trace Schedules Using String Matching"; In proceedings of the 10th International Symposium on High Performance Computer Architecture (2004); 12 pgs.

(Continued)

*Primary Examiner* — John M Lindlof
(74) *Attorney, Agent, or Firm* — CHIP LAW GROUP

(57) ABSTRACT

A method of performing instruction marking in a computer processor architecture includes fetching instructions from a memory unit by a fetching unit in the computer processor architecture. Instruction groups for marking are determined. Fetched instructions are matched to instruction groups for marking. The fetched instructions are marked. Some of the marked instructions are selectively unmarked. The marked and unmarked instructions are forwarded to a queue of instructions for processing in the computer processor architecture.

20 Claims, 7 Drawing Sheets

(56) References Cited

U.S. PATENT DOCUMENTS

| | | | | |
|---|---|---|---|---|
| 2017/0178278 A1* | 6/2017 | Drabinski | ............... | G06F 9/328 |
| 2018/0060075 A1 | 3/2018 | Chou et al. | | |
| 2019/0129716 A1 | 5/2019 | Calciu et al. | | |
| 2019/0332383 A1 | 10/2019 | Gschwind et al. | | |
| 2020/0150966 A1 | 5/2020 | Agrawal et al. | | |
| 2020/0174796 A1 | 6/2020 | Swanson et al. | | |
| 2021/0056034 A1 | 2/2021 | Pusdesris et al. | | |
| 2022/0067155 A1* | 3/2022 | Favor | ................... | G06F 21/556 |

OTHER PUBLICATIONS

Perais, A. et al., "Elastic Instruction Fetching"; IEEE International Symposium on High Performance Computer Architecture (HPCA—2019); 13 pgs.
Tullsen, D. M. et al., "Exploiting Choice: Instruction Fetch and Issue on an Implementable Simultaneous Multithreading Processor"; Proceedings of the 23rd Annual International Symposium on Computer Architecture (1996); 12 pgs.
Asher, Y. B. et al., "Generating ASIPs with Reduced Number of Connections to the Register-File"; IEEE (2015); 8 pgs.
Dobrovolskyi, V., "Microprocessor with Tagged Registers Realizing Parallelism"; Advances in Cyber-Physical Systems (2018); vol. 3:1; 8 pgs.

* cited by examiner

| Instruction | Primary OpCode Bits 0:6 | Instruction Type Bits: 23:31 |
|---|---|---|
| Add | 0b111011 | 0b100001010 |
| Sub | 0b111011 | 0b100001010 |

FIG. 3

UN-MARK INSTRUCTIONS ON AN INSTRUCTION MATCH TO REDUCE RESOURCES REQUIRED TO MATCH A GROUP OF INSTRUCTIONS

BACKGROUND

Technical Field

The present disclosure generally relates to computer programming, and more particularly, to un-marking instructions on an instruction match to reduce resources to match a group of instructions.

Description of the Related Art

During the execution of instructions in a processor, an instruction or a large group of instructions might execute incorrectly due to an error in the design in the different units of a pipelined processor. Some previous techniques include using a matching mechanism to mark the instruction when fetched from the instruction cache and replacing the matched instruction with an opcode that causes the scheduling unit to take a special software interrupt and patch the instruction. The matching mechanism works by matching on the instruction opcode, the exact instruction type, instruction source operand, and instruction destination operands.

SUMMARY

According to an embodiment of the present disclosure, a method of performing instruction marking in a computer processor architecture is provided. The method includes fetching instructions from a memory unit by a fetching unit in the computer processor architecture. Instruction groups for marking are determined. Fetched instructions are matched to instruction groups for marking. The fetched instructions are marked based on the output of the marking and unmarking unit. The instructions along with the mark information are forwarded to a queue of instructions for processing in the computer processor architecture.

According to an embodiment of the present disclosure, a method of performing instruction marking in a computer processor architecture is provided. The method includes fetching instructions from a memory unit by a fetching unit in the computer processor architecture. Fetched instructions are identified by an instruction operation type in each respective fetched instruction. Instruction groups for marking are determined based on the identified instruction operation types. A marking unit mask is generated that designates instruction operating types for marking. An unmarking unit mask is generated that designates instruction operating types for unmarking. Fetched instructions are matched to instruction groups designated for marking. Fetched instructions are marked using the marking unit mask. Fetched instructions are also matched with the unmarking mask in the unmarking unit and the final mark information is generated for each instruction. The instructions and the mark information are then forwarded to the fetch queue.

According to an embodiment of the present disclosure, a computer processor architecture is provided. The architecture comprises a first memory cache. An instruction fetching unit is operable to retrieve instructions from the first memory cache. A matching unit is included. An instruction marking unit is configured to designate one or more instruction operation types for marking. The matching unit determines whether instructions fetched by the fetching unit include the one or more operation types designated for marking, and add marks to instructions including the one or more operation types designated for marking. An instruction unmarking unit removes a subset of the marked instructions, and unmarks the subset of marked instructions by removing the marking. A second memory cache is operable to receive the marked instructions, receive the unmarked instructions, and forward the marked instructions and unmarked instructions for processing.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 3 is a block diagram of an operating code according to embodiments.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to computer processor architecture and instruction processing. Generally, the embodiments may be practiced in the fields of computers. In the subject disclosure that follows, embodiments propose a computer chip processing architecture that includes two stages of marking instructions. In a first stage, the process adds marks to a set of instructions. In the second stage, the process subtracts a subset of the instructions from that marked set and removes the marking.

In comparison, current approaches only mark instructions and become limited by the resources available. The marking resources provide a work around of hardware defects. However, the system only has so many of these markers available. Once the markers are consumed, parts may need to be recalled from the field. Another stepping of hardware in the lab may be needed, an expensive and time-consuming step. Or, impossible trade-offs on which defects in the design are acceptable will need to be considered. As will be appreciated, aspects of the subject technology more efficiently capture mark patterns by marking many instructions and then masking off a the few of the instructions that may not need to be marked so that instead of using several marking units to add up to the pattern wanted, fewer marking units can be used to accomplish the same pattern. Embodiments of the subject technology improve the efficiency of instruction processing by modifying the matching mechanism and decreasing the effective resources that are required to mark multiple instructions sharing the same opcode and types or operands.

Example Methodology

In the following methods, flowcharts are shown to help describe the processes involved. It should be understood that the subject disclosure relates to computer processor chip technology (for example, microprocessors, central processing units, and the like), and that the steps in the processes disclosed are implementing executable instructions within a processor architecture.

Figure 1:
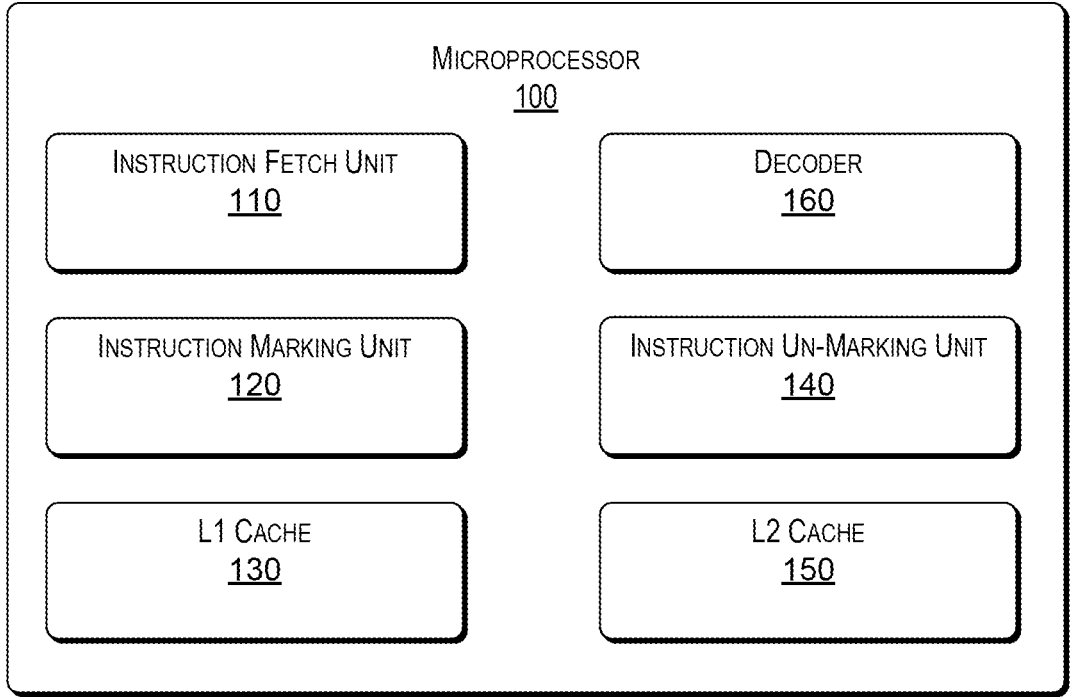
FIG. 1 is block diagram of a microprocessor chip architecture according to some embodiments.

Referring now to FIG. 1, a microprocessor 100 is shown according to an exemplary embodiment of a logic design. It will be understood that for the sake of illustration, not all the logic elements of the microprocessor 100 are shown. However, in the description that follows, elements that are used in the processes disclosed are shown for the reader to follow. Other elements of the microprocessor 100 not shown but known in the field may be present to perform other processing functions as needed.

In an exemplary embodiment, the microprocessor 100 includes an instruction fetch unit 110 configured to retrieve instructions for processing. An instruction marking unit 120 marks instructions retrieved from the fetch unit 110. Some embodiments may include one or both of an L1 cache 130 and L2 cache 150 storing instructions. Embodiments may also include a decoder (or decoding unit) 160 for converting the opcode bits in the instructions.

An exemplary embodiment includes an instruction un-marking unit 140, in the logic design, that selectively un-marks some instructions as will be described in further detail below. "Un-marking" as used herein refers to removing or masking off some identifying element from an instruction. For example, in one process, an operation code (sometimes referred to in abbreviation as an "opcode" and also known as an instruction machine code, instruction code, instruction syllable, instruction parcel or opstring) may be marked by the operation to be performed by the instruction (for example, "ADD", "ADDC" (add with Carry), "SUB", "SUBC" (subtract with Carry), etc.). "Marking" may sometimes be known as "patching". The un-marking unit 140 may remove the marking identifying the opcode type. As will be seen, this un-marking liberates some marking resources.

Figure 2:
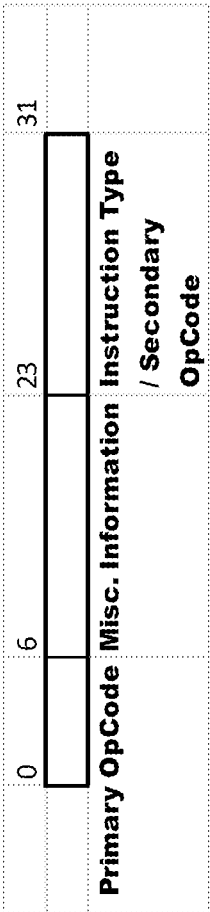
FIG. 2 is a block diagram of an example set of instructions bit sequence according to embodiments.

FIG. 2 shows an example of an instruction string that may be processed by the subject technology. The string may include opcode identifying bits, information related to the instruction, and an instruction type or secondary opcode.

FIG. 3 shows an example of an instruction packet scheme that includes an instruction type, opcode bit format, and instruction type bit format.

Exemplary embodiments improve on the instruction matching mechanism in the fetch unit of the microprocessor 100 by including the un-marking unit 140. As an illustrative example, software running on the microprocessor 100 may have instructions with the opcode 1. Opcode 1 may include the following instructions in a test: ADD, SUB, ADDC, SUBC, MUL. A desired goal is to use the matching mechanism to mark only ADD, SUB, ADDC and SUBC.

In some current logic designs, the requirement for the number of instruction matching resources to achieve this might be four (4) (in other words, there are four separate matching resources to mark all four instructions individually but setting a separate condition for each). To reduce the resources, the unmarking unit 140 matches on MUL only and unmarks the instruction before passing it to the queue of instructions that is fed into the next stages of the microprocessor 100. The matching process of marking some instruction and unmarking other instructions will ensure that ADD, SUB, ADDC and SUBC will still be marked and will still activate the patching mechanism whereas MUL will be unmarked and will go through the next stages of the pipeline without an interrupt. The subject technology now results in a requirement of only two instruction matching resources to achieve the same result as previous logic designs.

Figure 4:
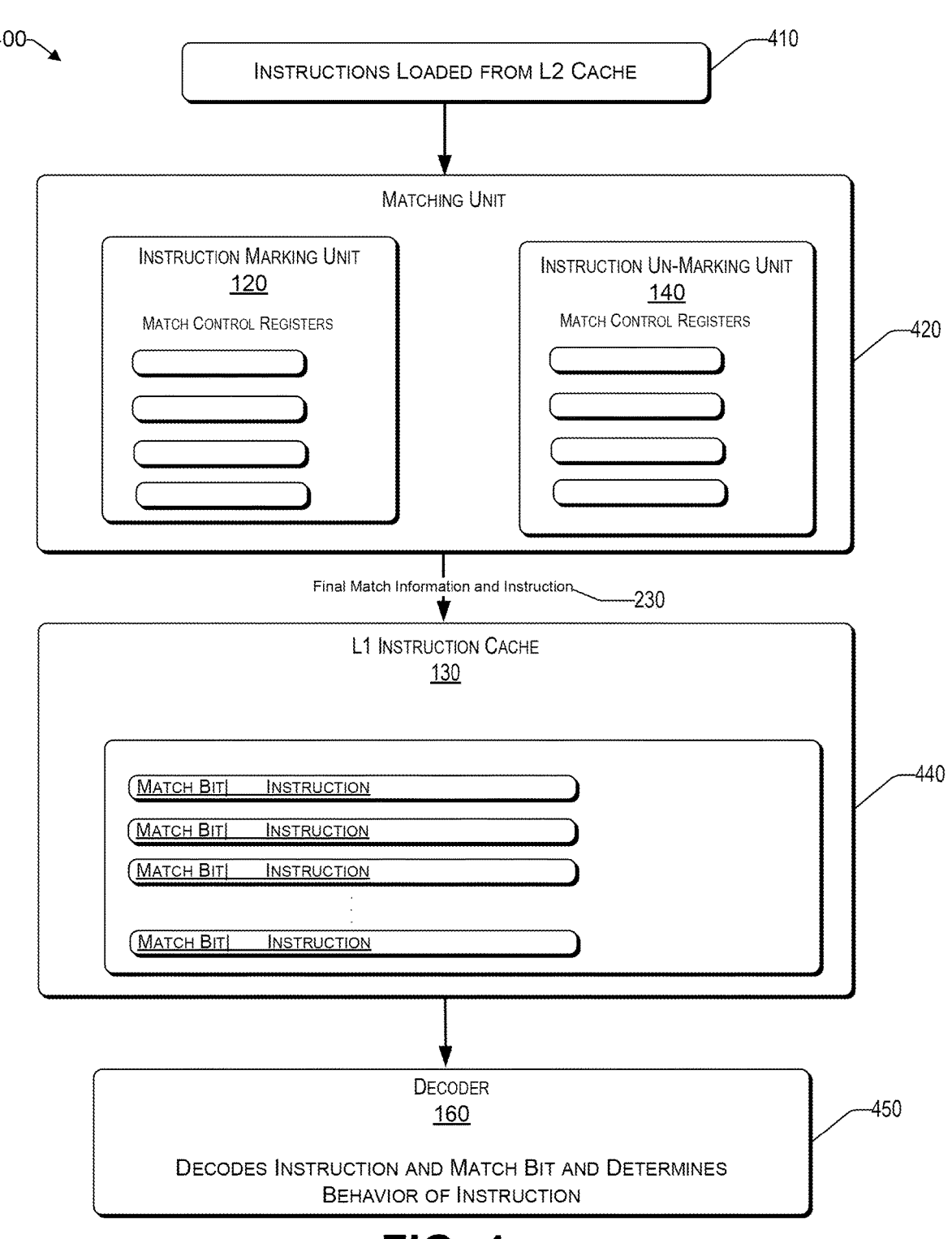
FIG. 4 is a flowchart of a method performing instruction matching in a microprocessor according to some embodiments.

FIG. 4 shows a general logic control process 400 according to an exemplary embodiment. Instructions may be retrieved or loaded 410 from an instruction cache (for example, cache L2). In a matching unit, instruction bits may be marked for their operation and selectively un-marked 420. Matching information for marked and un-marked instruction bits may be generated 430 from the results of the matching unit. The matched instructions may be forwarded 440 to an instruction cache (for example, L1 cache). The decoding unit may decode instructions and match bits and determine 450 the behavior of respective instructions. Marked instructions may move on as a debug interrupt if the instruction tries to complete its operation. An unmarked instruction moves on as an instruction and thus completes normally as if it had never been marked.

Figure 5:
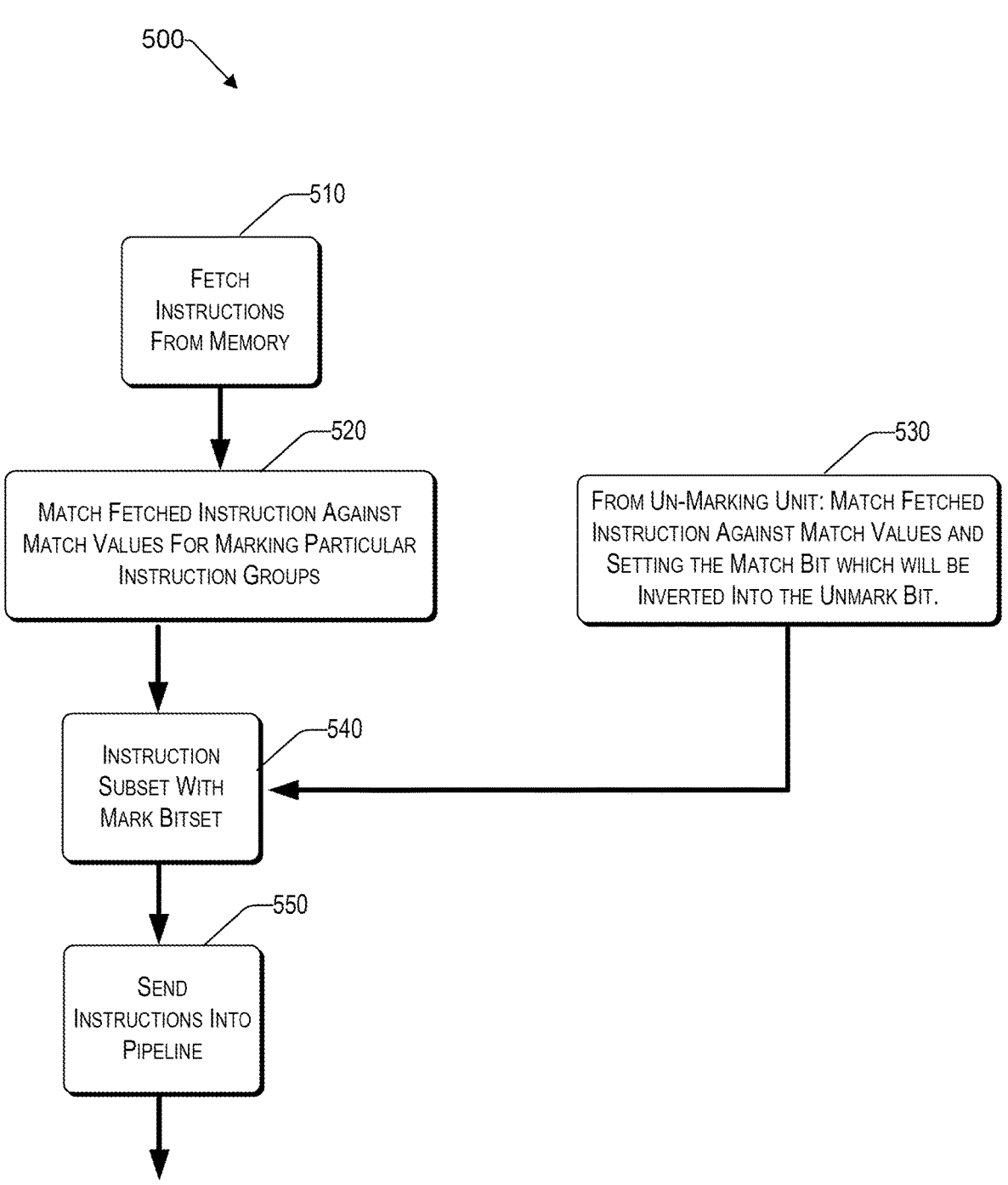
FIG. 5 is a flowchart of a method performing marking on instructions in a microprocessor according to some embodiments.

Referring now to FIG. 5, a method 500 of marking on instructions in a microprocessor is shown according to an exemplary embodiment. A fetch unit may fetch 510 instructions from memory. Fetched instructions may be matched 520 against match values for particular instruction groups. For example, several instructions with the same opcode may be matched. In an un-marking unit, some fetched instructions may be matched against match values and setting the match bit will be inverted 530 into an unmark bit. Exemplary details of how bits may be set for marking and unmarking may be seen in FIG. 6. Instructions that have restrictions may be unmarked and the mark bits set on all the instructions that matched may be kept. The queue in the fetch unit stores 540 the instructions with a mark bit set before forwarding 550 the instructions into the processor pipeline.

Figure 6:
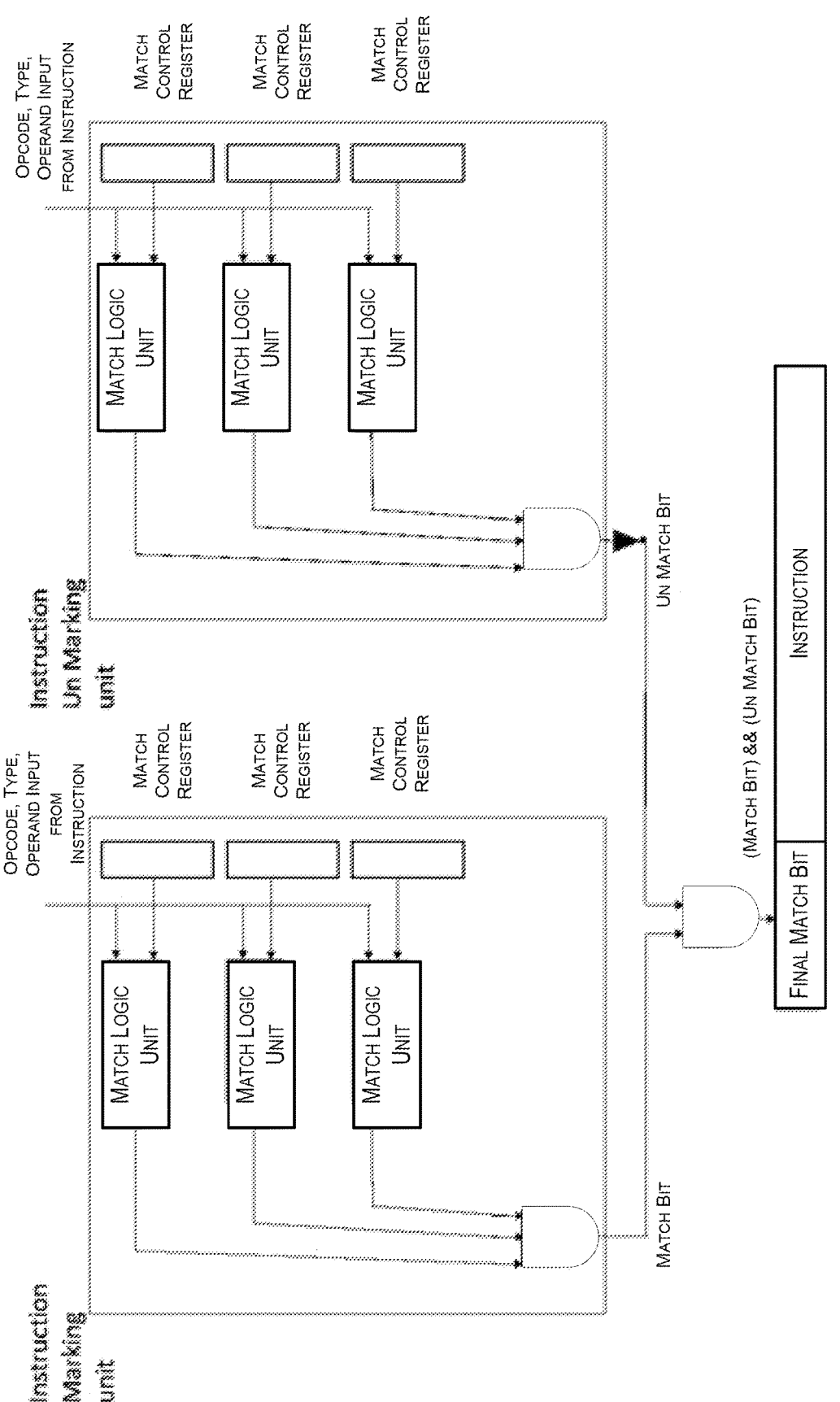
FIG. 6 is a flowchart of a method for selectively marking instructions in a microprocessor according to some embodiments.

FIG. 6 describes a more detailed implementation of the subject technology, consistent with an illustrative embodiment. The opcode input from the instruction stream in the instruction cache is fed into both the Marking and the Un-Marking unit. The match control registers may hold the information of the instructions that need to be matched. This information may be, for example, opcode, type, and operands. The match logic unit may match this information from the input instruction stream and generates match bits. The match bit may then also be combined with the Un Match bit to generate a final match bit that is stored along with the instruction.

Taking the same example from above and considering that a microprocessor may have only three instruction marking units, then achieving the objective of marking ADD, SUB, ADDC and SUBC is not possible. Since instead of using just opcode, both opcode plus the instruction type of each of the four instructions are defined in the match control register. Thus, the previous approaches run out of marking resources. With the subject technology, only one marking and an unmarking unit can be used to achieve the objective of marking four instructions and unmarking MUL.

Example Unmarking Process

Example

A bug/verification coverage experiment might require marking the following instructions with the corresponding primary opcode, as provided in Table 1 below:

TABLE 1

| INSTRUCTION | PRIMARY OPCODE bits 0:6 | Instruction type bits 22:30 |
|---|---|---|
| ADD | 0b111011 | 0b100001010 |
| SUB | 0b111011 | 0b000101000 |
| ADDC | 0b111011 | 0b100100100 |
| SUBC | 0b111011 | 0b110001001 |

But there also exists another instruction with the same primary opcode but a different instruction type field.

TABLE 2

| INSTRUCTION | PRIMARY OPCODE bits 0:6 | Instruction type bits 22:30 |
|---|---|---|
| MUL | 0b111011 | 0b111100101 |

To mark the ADD, SUB, ADDC and SUBC in prior art approaches might require four different marking resources, as each matching mask is set up to mark one instruction using both the primary opcode and instruction type bits. Example masks are below, Where IM refers to instruction marking and IUM is instruction unmarking units.

IM0: 0b111011XXXXXXXXXXXXXXXX100001010X {ADD}

IM1: 0b111011XXXXXXXXXXXXXXXX000101000X {SUB}

IM2: 0b111011XXXXXXXXXXXXXXXX100100100X {ADDC}

IM3: 0b111011XXXXXXXXXXXXXXXX110001001X {SUBC}

The improved architecture can achieve this using one marking and one un-marking unit.

The marking unit can mark all the instructions with opcode 0b111011 by setting the mask to only match those bits and set others to ignore. The unmarking unit can then be set up with the mask for MUL, which includes the primary opcode bits as well as the instruction type bits for MUL. Example masks for marking and unmarking are provided below. The mask with the prefix "IM0" is the marking mask. The mask with the prefix "IUM0" is the unmarking mask.

IM0:
0b111011XXXXXXXXXXXXXXXXXXXXXXXXX {ADD, SUB, ADDC, SUBC}

IUM0: 0b111011XXXXXXXXXXXXXXXX111100101X {MUL}

In the example above, all five instructions share the same primary opcode. However, there is a need to mark all of them except MUL. In the old approach, four marking resources in the old approach. Under the subject technology, only two marking resources are needed (one marking resource for marking and one resource for unmarking or masking out the instruction to be ignored). In this example, the marking mask will cause all five instructions to be marked and then the unmarking mask will match on the MUL and will update the mark bit to not mark MUL.

Example Computer Platform

Figure 7:
FIG. 7 is a functional block diagram illustration of a computer hardware platform that can communicate with various networked components.
Figure 7:
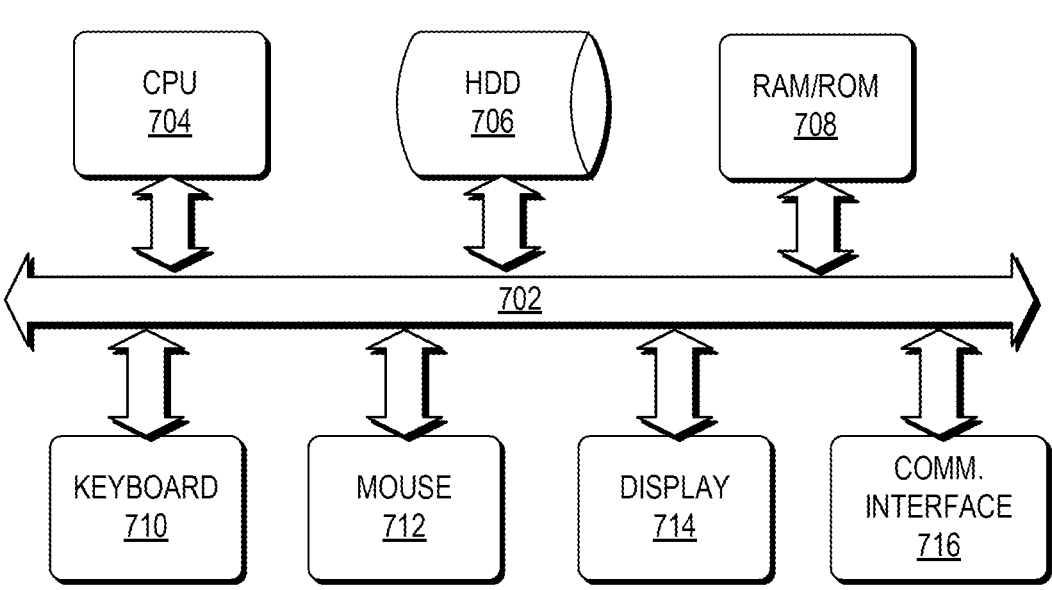

As discussed above, functions relating to dependency skipping in the execution of processor functions are performed with the use of a computing device. FIG. 7 is a functional block diagram illustration of a computer hardware platform that can communicate with various networked components or operate as a standalone device. FIG. 7 shows a computing device 700 that may be, for example, a personal computer, a network computer platform, or a host computer platform.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the processes described in FIGS. 4, 5, and 6, in a manner described herein.

The CPU 704 may include architecture for processing instructions similar to the structure described for the microprocessor 100 in FIG. 1.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of performing instruction marking in a computer processor architecture, the computer-implemented method comprising:

fetching, by a fetching unit in the computer processor architecture, instructions from a memory unit, wherein each instruction of the fetched instructions comprises bits associated with a primary operation code of a respective instruction of the fetched instructions, bits associated with information of the respective instruction, and bits associated with an instruction type of the respective instruction;

determining instruction groups for marking the fetched instructions;

matching the fetched instructions to the instruction groups for the marking of the fetched instructions, wherein each instruction group of the instruction groups comprises a respective plurality of instructions of the fetched instructions;

for each instruction group of the instruction groups, marking the respective plurality of instructions of a corresponding instruction group of the instruction groups, wherein the respective plurality of instructions is marked using a single marking resource instead of marking each instruction of the respective plurality of instructions individually using a respective marking resource of a plurality of marking resources for processing in the computer processor architecture, the single marking resource is associated with a matching mask that includes the bits associated with the primary operation code, and the bits associated with the primary operation code are same for each instruction of the respective plurality of instructions;

for each instruction group of the instruction groups, selectively unmarking a set of instructions from the marked respective plurality of instructions in the corresponding instruction group, wherein each instruction of the set of instructions is unmarked using a respective unmarking resource of a set of unmarking resources; and forwarding the marked respective plurality of instructions and the unmarked set of instructions to a queue of instructions for the processing in the computer processor architecture.

2. The computer-implemented method of claim 1, wherein the marking of the respective plurality of instructions includes identifying each instruction of the respective plurality of instructions based on an instruction operation type.

3. The computer-implemented method of claim 2, wherein the marking of the respective plurality of instructions further includes setting the instruction operation type of each instruction of the respective plurality of instructions.

4. The computer-implemented method of claim 3, wherein the selectively unmarking of the set of instructions includes setting one or more instruction operation types of each instruction of the set of instructions, wherein the one or more instruction operation types exclude the instruction operation type.

5. The computer-implemented method of claim 1, wherein the marked respective plurality of instructions and the unmarked set of instructions share the primary operation code.

6. The computer-implemented method of claim 1, wherein the unmarked set of instructions is processed without an interrupt.

7. The computer-implemented method of claim 1, further comprising:

setting, during the marking of the respective plurality of instructions, the bits associated with the primary operation code, wherein the bits associated with the primary operation code are same for each instruction of the respective plurality of instructions; and setting, to an ignore status, the bits associated with the information of each instruction of the respective plurality of instructions and the bits associated with the instruction type of each instruction of the respective plurality of instructions.

8. The computer-implemented method of claim 1, wherein the marking of the respective plurality of instructions includes:

setting the matching mask to mark the respective plurality of instructions sharing the same primary operation code;

setting the matching mask to match an instruction operation type of each instruction of the respective plurality of instructions sharing the same primary operation code; and setting the matching mask to ignore instruction operation types of each instruction of the respective plurality of instructions sharing the same primary operation code, wherein the instruction operation types exclude the instruction operation type.

9. The computer-implemented method of claim 1, wherein each matching mask, of a plurality of matching masks associated with the plurality of marking resources, includes the bits associated with the primary operation code and the bits associated with the instruction type, and the bits associated with the instruction type are different for each instruction of the respective plurality of instructions.

10. A computer-implemented method of performing instruction marking in a computer processor architecture, the computer-implemented method comprising:

fetching, by a fetching unit in the computer processor architecture, instructions from a memory unit, wherein each instruction of the fetched instructions comprises bits associated with a primary operation code of a respective instruction of the fetched instructions, bits associated with information of the respective instruction, and bits associated with an instruction type of the respective instruction;

identifying an instruction operand type of each instruction of the fetched instructions;

determining instruction groups, for marking of the fetched instructions, based on the identified instruction operand type of each instruction of the fetched instructions;

generating a marking unit mask for the marking of the fetched instructions;

generating an unmarking unit mask for unmarking of a set of instructions;

matching the fetched instructions to the instruction groups, wherein each instruction group of the instruction groups comprises a respective plurality of instructions of the fetched instructions;

for each instruction group of the instruction groups, marking the respective plurality of instructions of a corresponding instruction group of the instruction groups, wherein the respective plurality of instructions is marked using a single marking resource instead of marking each instruction of the respective plurality of instructions individually using a respective marking resource of a plurality of marking resources for processing in the computer processor architecture, the marking unit mask associated with the single marking resource includes the bits associated with the primary operation code, and the bits associated with the primary operation code are same for each instruction of the respective plurality of instructions;

for each instruction group of the instruction groups, selectively unmarking the set of instructions from the marked respective plurality of instructions, wherein a first instruction of the set of instructions is unmarked using the unmarking unit mask; and

forwarding the marked respective plurality of instructions and the unmarked set of instructions to a queue of instructions for the processing in the computer processor architecture.

11. The computer-implemented method of claim 10, wherein instruction operand types for the unmarking exclude the instruction operand type for the marking.

12. The computer-implemented method of claim 10, wherein the marked respective plurality of instructions and the unmarked set of instructions share the primary operation code.

13. The computer-implemented method of claim 10, further comprising processing the unmarked set of instructions without an interrupt.

14. The computer-implemented method of claim 10, wherein the generating of the marking unit mask includes setting, to an ignore status, the bits associated with the information of each instruction of the respective plurality of instructions and the bits associated with the instruction type of each instruction of the respective plurality of instructions.

15. A computer processor architecture, comprising:
a first memory cache;
an instruction fetching unit configured to retrieve instructions from the first memory cache, wherein each instruction of the retrieved instructions comprises bits associated with a primary operation code of a respective instruction of the retrieved instructions, bits associated with information of the respective instruction, and bits associated with an instruction type of the respective instruction;
a matching unit;
an instruction marking unit, wherein the instruction marking unit is configured to:
designate one or more instruction operation types for marking of the retrieved instructions;
determine whether the instructions retrieved by the instruction fetching unit include the one or more instruction operation types; and
add marks to a plurality of instructions of the retrieved instructions based on the plurality of instructions including the one or more instruction operation types, wherein
the plurality of instructions represents an instruction group,
the plurality of instructions is marked using a single marking resource instead of marking each instruction of the plurality of instructions individually using a respective marking resource of a plurality of marking resources for processing in the computer processor architecture,

the single marking resource is associated with a matching mask that includes the bits associated with the primary operation code, and
the bits associated with the primary operation code are same for each instruction of the plurality of instructions:
an instruction unmarking unit, wherein
the instruction unmarking unit is configured to selectively unmark a set of instructions from the marked plurality of instructions by removing the marking from the set of instructions, and
each instruction of the set of instructions is unmarked using a respective unmarking resource of a set of unmarking resources; and
a second memory cache operable to:
receive the marked plurality of instructions;
receive the unmarked set of instructions; and
forward the marked plurality of instructions and the unmarked set of instructions for the processing.

16. The computer processor architecture of claim 15, further comprising a decoder unit configured to:
decode the marked plurality of instructions; and
ignore the unmarked set of instructions.

17. The computer processor architecture of claim 15, wherein the instruction marking unit is further configured to set, to an ignore status, the bits associated with the information of each instruction of the plurality of instructions and the bits associated with the instruction type of each instruction of the plurality of instructions.

18. The computer processor architecture of claim 15, wherein one or more instruction operation types for the unmarking exclude the one or more instruction operation types set for the marking.

19. The computer processor architecture of claim 15, wherein the marked plurality of instructions and the unmarked set of instructions share the primary operation code.

20. The computer processor architecture of claim 15, wherein the matching unit is configured to:
set the matching mask, for use by the instruction marking unit, to mark the plurality of instructions sharing the same primary operation code;
set the matching mask to match the one or more instruction operation types of each instruction of the plurality of instructions sharing the same primary operation code; and
set the matching mask to ignore instruction operation types of each instruction of the plurality of instructions sharing the same primary operation code, wherein the instruction operation types exclude the one or more instruction operation types.

* * * * *